United States Patent [19]

Burke et al.

[11] Patent Number: 5,485,633

[45] Date of Patent: Jan. 16, 1996

[54] METHOD FOR TRANSMITTING A MESSAGE TO MULTIPLE COMMUNICATION UNITS

[76] Inventors: James J. Burke, 501 Lacy, Streamwood, Ill. 60107; John W. Maher, 2845 Boerderij Way, Woodstock, Ill. 60098; William A. Thompson, 644 Patton Dr., Buffalo Grove, Ill. 60089

[21] Appl. No.: 69,795

[22] Filed: Jun. 1, 1993

[51] Int. Cl.$^6$ ........................................ H04B 7/26
[52] U.S. Cl. .................. 455/51.2; 455/56.1; 340/825.44
[58] Field of Search ............................... 455/15, 16, 17, 455/18, 33.1, 33.4, 51.1, 51.2, 53.1, 54.2, 56.1, 58.2, 59, 62, 63, 67.6; 379/59, 63; 340/825.44, 825.47

[56] References Cited

U.S. PATENT DOCUMENTS

| | | | |
|---|---|---|---|
| 4,682,165 | 7/1987 | Davis | 455/33.4 |
| 5,038,403 | 8/1991 | Leitch | 455/51.2 |
| 5,239,673 | 8/1993 | Natarajan | 455/56.1 |
| 5,263,177 | 11/1993 | Schieve et al. | 455/51.2 |

*Primary Examiner*—Andrew I. Faile
*Attorney, Agent, or Firm*—Christopher P. Moreno

[57] ABSTRACT

In communication system, multiple communication units are selected to receive a message via multiple broadcast units. A communication resource controller identifies a set of broadcast units needed to transmit the message, which are further identified as contending and non-contending broadcast units based on contention information. Identification of each of the contending broadcast units is stored and the non-contending broadcast units are allowed to simultaneously transmit the message. When contention for the contending broadcast units is alleviated, the contending broadcast units transmit the message.

7 Claims, 3 Drawing Sheets

METHOD FOR TRANSMITTING A MESSAGE TO MULTIPLE COMMUNICATION UNITS

FIELD OF THE INVENTION

The present invention relates generally to communication systems and, in particular, to transmitting messages to multiple communication units located throughout the communication system.

BACKGROUND OF THE INVENTION

Communication systems are known to comprise a plurality of communication units, a limited number of communication resources (channels), an operator station, a communication resource controller, and a plurality of broadcast units. An operator, via the operator station, may select many communication units as destinations for a paging message. After selecting the desired communication units, the operator station transmits the message to all of the selected communication units via the plurality of broadcast units. Typically, there are two ways to do this: sequentially or simultaneously.

In a system that transmits sequentially, the message or paging message is sequentially sent to each communication unit. Obviously, this is an inefficient method when a large number of communication units are selected to receive a message requiring several seconds to transmit. In a simultaneous system, the message is transmitted via multiple broadcast units at the same time. This method can greatly improve the efficiency of transmitting a message to multiple communication units. However, a shortcoming of the simultaneous method is that conflicts can arise which prevent the transmission of the paging message to two or more communication units at the same time.

In systems that transmit simultaneously, a conflict occurs when paging messages are required on two different channels of a multi-channel broadcast unit. Also, paging messages cannot be simultaneously transmitted via channels which are cross-busied in the system. Cross-busied channels are channels known to interfere with one another, thus severely degrading their performance. In most simultaneous paging systems experiencing these limitations, the operator is not allowed to select communication units located in coverage areas of certain broadcast units that are known to create conflicts. To transmit a paging message to a large number of potentially conflicting communication units could take substantially longer, thus nullifying the advantage of simultaneous systems. This is a particularly crucial problem when time is in short supply, as might be the case when attempting to notify members of a volunteer fire department of an ongoing emergency.

Simulcast communication systems eliminate the problems of contention described above. Such systems typically provide single-channel coverage, thus eliminating contention, over very large geographical regions. Simulcast systems are useful when multiple communication units can be located anywhere within a large coverage area. However, such systems are expensive and are not very cost-effective when communication units are restricted to a relatively small coverage area, as would be the case for a paging system.

Therefore, a need exists for a method which allows the selection and efficient processing of conflicting communication units in a simultaneous paging system.

DESCRIPTION OF A PREFERRED EMBODIMENT

Generally, the present invention provides a method for transmitting a message to multiple communication units via a set of broadcast units. This is accomplished by identifying the multiple communication units designated to receive the message. From this information, the set of broadcast units is identified, wherein the set includes broadcast units that are needed to send the message to the multiple communication units. Contending and non-contending broadcast units are identified from the set of broadcast units, with the identification of the contending broadcast units being stored in memory. The message is transmitted by the non-contending broadcast units, followed by transmission of the message by each of the contending broadcast units once the contention for each contending broadcast unit has been alleviated.

Figure 1:
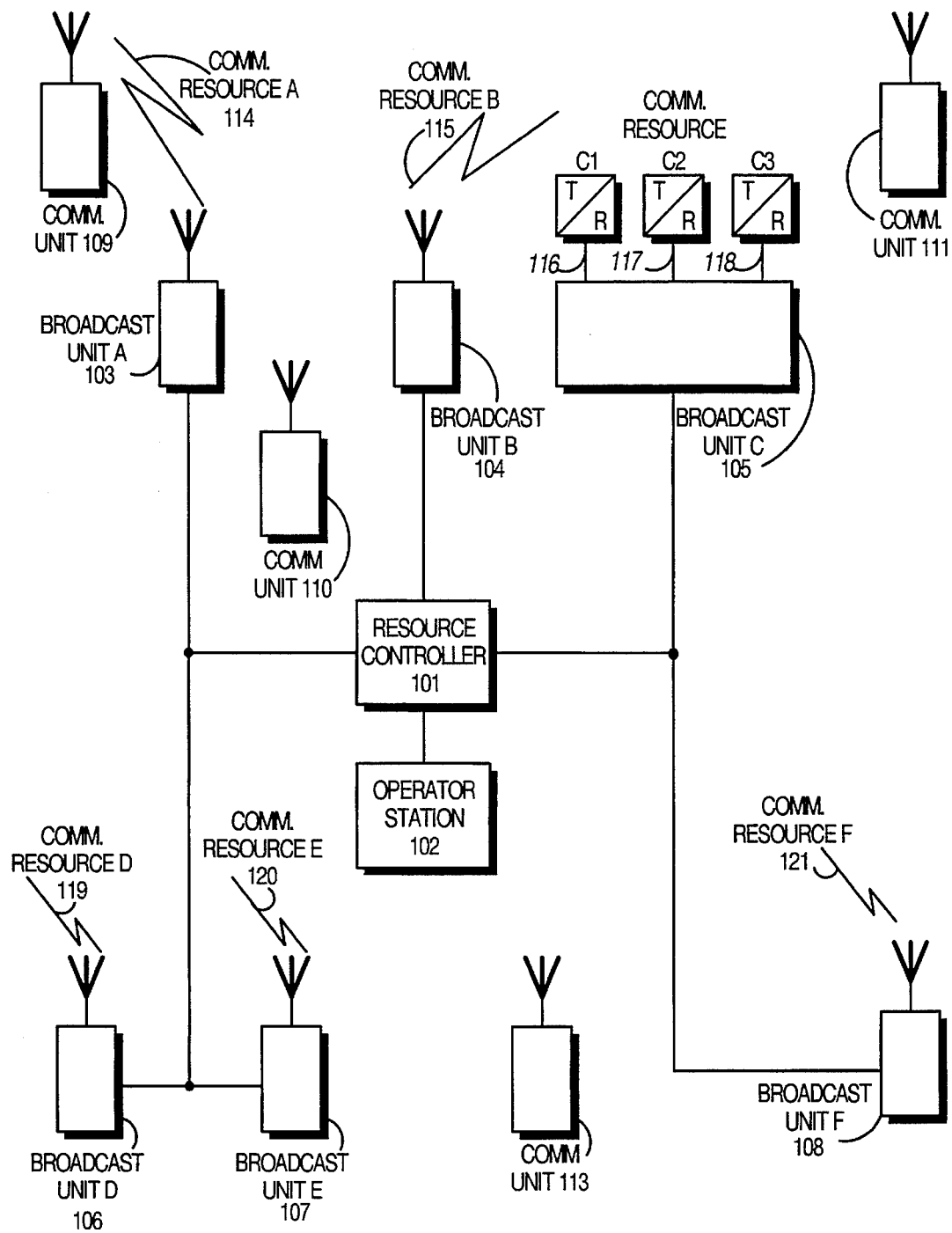
FIG. 1 illustrates a communication system in accordance with the present invention.
Figure 1:
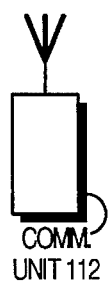

The present invention can be more fully described with reference to FIGS. 1–3. FIG. 1 illustrates a communication system, that includes a communication resource controller 101, an operator station 102, a plurality of broadcast units 103–108, a plurality of communication units 109–113, and a plurality of communication resources 114–121. The communication resources 114–121 may comprise RF (radio frequency) channels such as pairs of frequency carriers, time division multiplex (TDM) slots, or any other RF transmission mediums. The communication resource controller 101 comprises a device that can accept all of the information necessary to communicate at least one message to the communication units 109–113, such as an Operator Mux Interface (OMI) resident in a Central Electronics Bank (CEB) as described in U.S. Pat. No. 4,630,263 which is incorporated herein as reference. The information necessary to communicate at least one message to a communication unit 109–113 comprises, in part, identity of the multiple communication units and the required communication resources 114–121. With this information, the communication resource controller 101 can determine the broadcast units 103–108 necessary to transmit the message or messages.

The operator station 102 comprises a device that allows the message, identity of the desired communication units 109–113, and the required communication resources 114–121 to be entered into the communication resource controller 101, such as a CENTRACOM SERIES II PLUS dispatcher console made by Motorola, Inc. The communication units 109–113 are devices capable of receiving a paging message and performing an action based on the message, such as visually displaying the message or providing some auxiliary control. For example, the communication units could be could be Motorola BRAVO™ or BPR200 pagers. The broadcast units 103–108 are devices capable of receiving messages from the communication resource controller 101 and transmitting the message to the communication units 109–113 via the communication resources 114–121. Examples of these are Motorola MSF 5000™ and MICOR® base stations.

Assuming for the moment that contention does not exist between the broadcast units 103–108, an operator at the operator station 102 selects a message and the communications units 109–113 to receive the message. It is understood that multiple groups of communication units could be selected in addition to individual communication units. Upon completion of this task, the operator station 102 sends this information to the communication resource controller 101 which determines identity of a set of broadcast units needed to transmit the message. The communication resource controller 101 also determines if contention exists between any of the broadcast units within the set of broadcast units. If only non-contending broadcast units exist within the set of broadcast units, the message is sent to the broadcast units for transmission, via their assigned communication resources 114–121, to the multiple communication units.

As mentioned above, prior art systems do not allow a message to be sent to communication units when contention exists between the broadcast units. For the purposes of example, FIG. 1 is hereafter assumed to show contention in two forms. The first form of contention results from the physical proximity of broadcast units and/or the overlapping of incompatible communication resource coverage areas. These circumstances lead to broadcast units unable to transmit simultaneously without interfering with each others signal. In FIG. 1, this is illustrated by broadcast unit A 103 in close physical proximity with broadcast unit B 104 and by broadcast unit D 106 in close physical proximity with broadcast unit E 107.

The second form of contention occurs when a broadcast unit can transmit on multiple communication resources, with the restriction that only one communication resource is used at a time. In FIG. 1, this is shown in broadcast unit C 105 which has 3 communication resources on which it can transmit: communication resources C1, C2, and C3 116–118. When a message requires to be transmitted on broadcast unit C on differing communication resources, contention is created.

A third form of contention, not shown in FIG. 1, occurs when a message must be simultaneously transmitted to two or more communication units using the same broadcast unit. The present invention solves the problem of contention between broadcast units as detailed in the method of FIG. 2.

Figure 2:
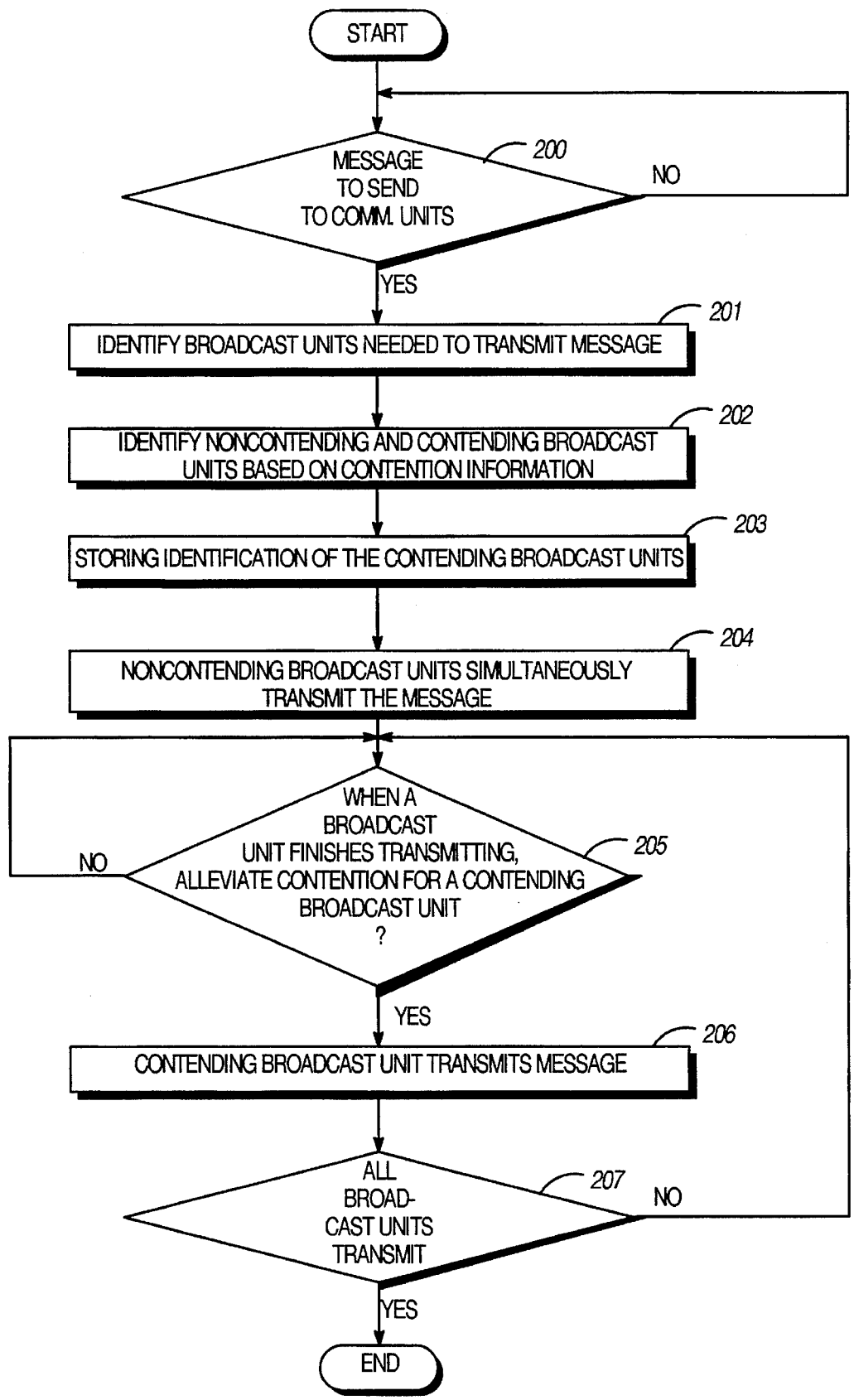
FIG. 2 illustrates a logic diagram that may be used by a communication resource controller and an operator station to implement the present invention.

FIG. 2 illustrates a logic diagram that the communication resource controller 101 and the operator station 102 may incorporate to implement the present invention. At step 200, it is determined if a message, along with the communication units 109–113 that should receive the message and the communication resources 114–121 necessary to transmit the message, have been entered into the operator station 102. When complete, this information is sent to the communication resource controller 101 which determines 201 the identities of a set of broadcasts units required to transmit the message to the multiple communication units. The identities of the set of broadcast units are stored in memory within the operator station 102 or communication resource controller 101. Identifying necessary broadcast units to transmit a message to multiple communication units is known, thus no further discussion will be presented.

The communication resource controller 101 (or the operator station 102) further determines 202 non-contending broadcast units and contending broadcast units based on stored contention information. The stored contention information comprises the identities of broadcast units that are known to be in contention with one another due to proximity, coverage area or multi-frequency conflicts, as described previously. Stepping through the stored broadcast unit identities, the present broadcast unit is checked for contention with each of the previous non-contending broadcast units. If contention does not exist with any of the previous non-contending broadcast units, the present broadcast unit is stored as a non-contending broadcast unit. If, however, contention does exist, identification of the present broadcast unit as a contending broadcast unit is stored 203. It is understood that once contending and non-contending broadcast unit have been determined, it is possible to further identify a priority set of broadcast units which take precedence over previously identified non-contending broadcast units, provided that none of the broadcast units in the priority set are in contention with one another.

Having established which broadcast units are non-contending, the communication resource controller 101 sends the message to the non-contending broadcast units. The non-contending broadcast units begin transmitting the message upon receiving the message from the communication resource controller 101 (or operator station 102) such that the transmissions occur simultaneously 204. In the context of the present invention, simultaneously transmitted messages are understood to be messages that were sent to a plurality of broadcast units at substantially identical times, but, due to varying delay times in the broadcast unit links, are not simultaneously transmitted to the communication units.

The communication resource controller 101 (or operator station 102) is notified whenever a broadcast unit has finished transmitting a message. As a result, the communication resource controller 101 (or operator station 102) determines if contention for any of the contending broadcast units has been alleviated 205. If the contention for a contending broadcast unit has been alleviated, that contending broadcast unit is allowed to transmit the message 206. Contention is considered alleviated when the condition or conditions that gave rise to the contention no longer exist. For instance, if broadcast unit E 107 is considered a contending broadcast unit with broadcast unit D 108, which is currently transmitting, due to proximity restrictions, the contention for broadcast unit E 107 would be alleviated once broadcast unit D 108 concluded its current transmission. If all required broadcast units (non-contending and contending) have been allowed to transmit the message 207, the process is complete. If not, steps 205 through 207 are repeated as necessary until all required broadcast units have been allowed to transmit. The entire process just described is best illustrated with a working example.

Figure 3:
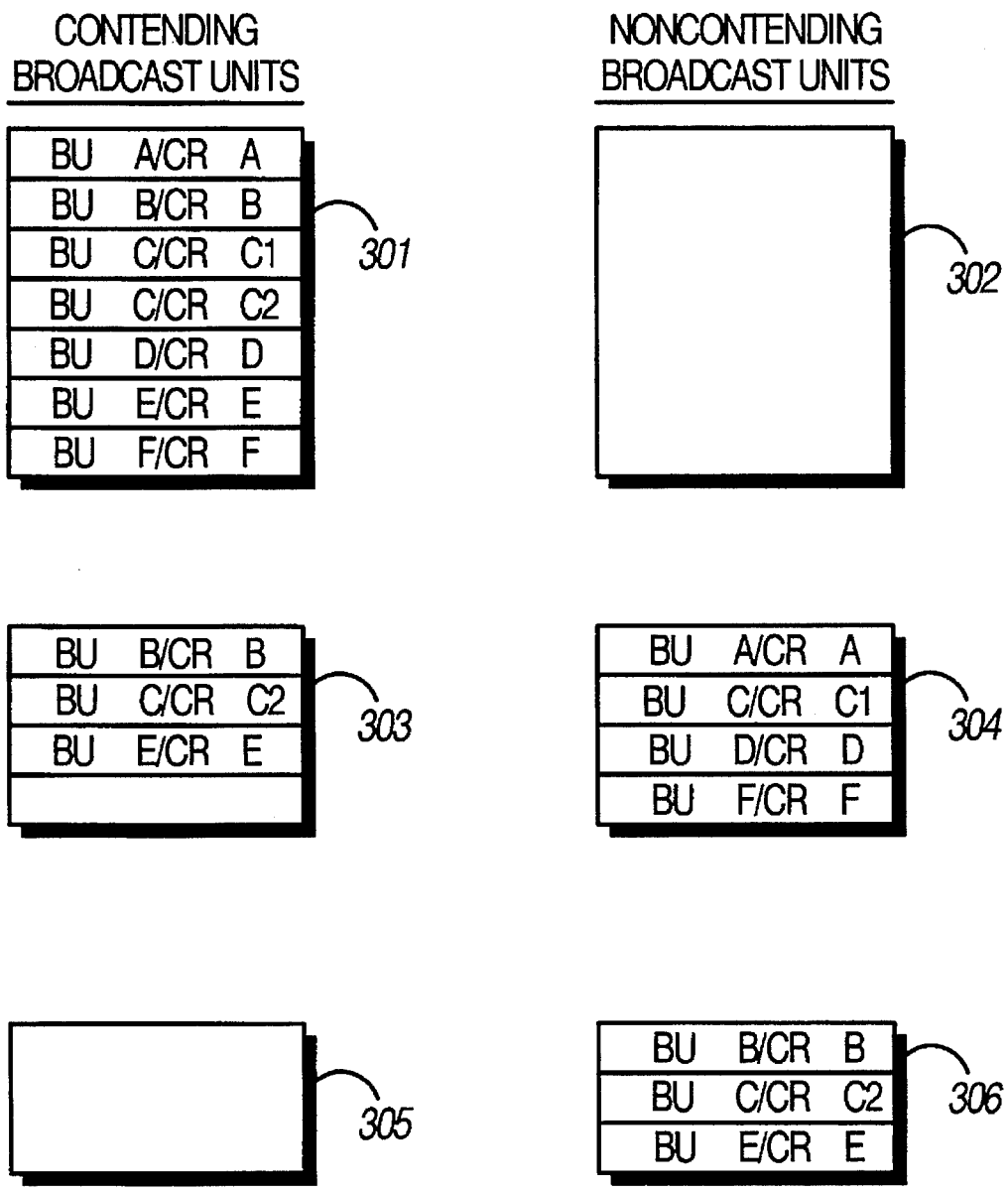
FIG. 3 illustrates a working example in accordance with the present invention.

FIG. 3 illustrates a working example in accordance with the present invention. In this example, messages to be transmitted to the communication units 109–113 are identified with the broadcast units 103–108 and the communication resources 114–121 needed to transmit the messages. The symbol "BU x/CR y" corresponds to a resource necessary to send the message, wherein "BU x" represents broadcast unit x and "CRy" represents communication resource y. Thus, the message to be transmitted via broadcast unit C 105 and communication resource C3 118 would be represented as BU C/CR C3.

It is assumed at the outset that the operator of the operator station 102 has entered a message(s), selected the communication units 109–113 to receive the message(s), and the communication resources 114–121 necessary to transmit the message(s) have been determined. The operator station 102 sends this information to the communication resource controller 101 which identifies and stores the required broadcast units and communication resources 301, which are initially assumed to be contending with one another. Thus, there are no non-contending broadcast units 302 shown.

The communication resource controller 101 identifies the contending and non-contending broadcast units based on the contention information previously described for FIG.1. For example, the first resource, BU A/CR A, is chosen as a non-contending broadcast unit 304 by virtue of its position (first entry in memory). It is understood that any of the initially contending broadcast units 301 could have been chosen as the first non-contending broadcast unit. Proceeding sequentially through the contending broadcast units 301, the second resource, BU B/CR B, is in contention with at least one of the non-contending broadcast units (at this point, only BU A/CR A) and therefore is identified as a contending broadcast unit 303. The third resource, BU C/CR C1 is not in contention with any of the previous non-contending broadcast units, therefore it is identified as a non-contending broadcast unit 304. The fourth resource, BU C/CR C2, is in contention with BU C/CR C2 and is therefore identified as a contending broadcast unit 303. The fifth resource, BU D/CR D, is not in contention with any of the previous non-contending broadcast units, therefore it is identified as a non-contending broadcast unit 304. The sixth resource, BU E/CR E, is in contention with BU D/CR D and is therefore identified as a contending broadcast unit 303. The seventh and final resource, BU F/CR F is not in contention with any of the previous non-contending broadcast units, and is identified as a non-contending broadcast unit 304.

The message is transmitted by the non-contending broadcast units 304, thus alleviating contention for the contending broadcast units 303. The process shown above is repeated revealing that the remaining contending broadcast units 303 are no longer in contention and are therefore identified as non-contending broadcast units 306. The list of contending broadcast units 305 is now seen to be empty and the process is completed with the transmission of the message via the non-contending broadcast units 306.

To one skilled in the art, it is obvious that the communication system of FIG. 1 could be a paging system wherein the communication units 109–113 would be paging units and/or multiple groups of paging units and the messages could be either voice or data. In a radio system, the messages could be voice or data or, alternatively, can be used to sound alarms, provide auxiliary control, or send additional information to the user. However, the overall operation is the same.

The present invention provides a method for transmitting a message via multiple broadcast units. With this method, the prior limitation of simultaneous transmission of certain broadcast units is eliminated. The present invention allows all broadcast units to be selected for simultaneous transmission. In addition, the present invention provides the full message coverage of a sequential transmission system without the time required to perform sequential transmissions.

We claim:

1. In a communication system comprising a plurality of communication units, a limited number of communication resources, a plurality of broadcast units that transceive the limited number of communication resources, and a communication resource controller that allocates the limited number of communication resources among the plurality of communication units, a method for transmitting at least one message, the method comprising the steps of:

a) identifying communication units of the plurality of communication units to receive the at least one message;

b) identifying, by the communication resource controller, a set of broadcast units of the plurality of broadcast units, wherein each broadcast unit of the set of broadcast units is needed to transmit the at least one message;

c) storing, by the communication resource controller, identities of the set of broadcast units;

d) identifying, by the communication resource controller, non-contending broadcast units and contending broadcast units of the set of broadcast units based on contention information and an order in which the identities of the set of broadcast units were stored;

e) storing, by the communication resource controller, identification of each of the contending broadcast units;

f) transmitting, by the non-contending broadcast units, the at least one message at a substantially identical time; and g) transmitting, by each of the contending broadcast units, the at least one message when, based on the contention information, contention for the contending broadcast units has been alleviated.

2. The method of claim 1, step (d) further comprising the steps of:

1) identifying a broadcast unit corresponding to an initial identity of the identities as a non-contending broadcast unit, wherein the initial identity is based on the order in which the identities were stored;

2) identifying at least one subsequent broadcast unit corresponding to at least one subsequent identity of the identities as a non-contending broadcast unit when the at least one subsequent broadcast unit is not in contention with any non-contending broadcast unit based on the contention information, wherein the at least one subsequent identity is based on the order in which the identities were stored; and 3) identifying the at least one subsequent broadcast unit corresponding to the at least one subsequent identity as a contending broadcast unit when the at least one subsequent broadcast unit is in contention with any non-contending broadcast unit based on the contention information.

3. The method of claim 1, step (g) further comprising the steps of: for each of the contending broadcast units:

1) determining, by the communication resource controller, that at least one non-contending broadcast unit of the non-contending broadcast units has finished transmitting the at least one message, wherein the contending broadcast unit is in contention with the at least one non-contending broadcast unit; and 2) allowing, by the communication resource controller, the contending broadcast unit to transmit the at least one message when the at least one non-contending broadcast unit has finished transmitting.

4. In a communication system that includes a plurality of communication units, a limited number of communication resources, a plurality of broadcast units that transceive the limited number of communication resources, a communication resource controller that allocates the limited number of communication resources among the plurality of communication units, and an operator station, a method to send at least one message to multiple communication units, the method comprising the steps of:

a) receiving, by the operator station, identification of the multiple communication units that were selected by an operator of the operator station;

b) storing, by the operator station, the identification of the multiple communications units;

c) identifying, by the communication resource controller, a set of broadcast units of the plurality of broadcast units needed to transmit the at least one message to the multiple communication units;

d) storing identities of the set of broadcast units in either the communication resource controller or the operator station;

e) determining, by either the communication resource controller or the operator station, contending broadcast units and non-contending broadcast units of the set of broadcast units based on contention information and an order in which the identities of the set of broadcast units were stored;

f) storing, by either the communication resource controller or the operator station, identification of the contending broadcast units;

g) sending the at least one message to the non-contending broadcast units such that the non-contending broadcast units transmit the at least one message at a substantially identical time; and h) sending the at least one message to each of the contending broadcast units when contention for the contending broadcast unit has been alleviated.

5. The method of claim 4, step (e) further comprising the steps of:

1) identifying a broadcast unit corresponding to an initial identity of the identities as a non-contending broadcast unit, wherein the initial identity is based on the order in which the identities were stored;

2) identifying at least one subsequent broadcast unit corresponding to at least one subsequent identity of the identities as a non-contending broadcast unit when the at least one subsequent broadcast unit is not in contention with any non-contending broadcast unit based on the contention information, wherein the at least one subsequent identity is based on the order in which the identities were stored; and 3) identifying the at least one subsequent broadcast unit corresponding to the at least one subsequent identity as a contending broadcast unit when the at least one subsequent broadcast unit is in contention with any non-contending broadcast unit based on the contention information.

6. In a paging system that includes a plurality of paging units, a limited number of communication resources, a plurality of broadcast units that transceive the limited number of communication resources, and a communication resource controller that allocates the limited number of communication resources among the plurality of paging units, a method for transmitting at least one message, the method comprising the steps of:

a) identifying multiple paging units of the plurality of communication units to receive the at least one message;

b) identifying, by the communication resource controller, a set of broadcast units of the plurality of broadcast units, wherein each broadcast unit of the set of broadcast units is needed to transmit the at least one message;

c) storing, by the communication resource controller, identities of the set of broadcast units;

d) identifying, by the communication resource controller, non-contending broadcast units and contending broadcast units of the set of broadcast units based on contention information and an order in which the identities of the set of broadcast units were stored;

e) storing, by the communication resource controller, identification of each of the contending broadcast units;

f) transmitting, by the non-contending broadcast units, the at least one message at a substantially identical time; and g) transmitting, by at least one of the contending broadcast units, the at least one message when, based on the contention information, contention for the at least one contending broadcast unit has been alleviated.

7. In a paging system that includes a plurality of paging units, a limited number of communication resources, a plurality of broadcast units that transceive the limited number of communication resources, a communication resource controller that allocates the limited number of communication resources among the plurality of communication units, and an operator station, a method to send at least one message to multiple paging units, the method comprising the steps of:

a) receiving, by the operator station, identification of the multiple paging units that were selected by an operator of the operator station;

b) storing, by the operator station, the identification of the multiple paging units;

c) identifying, by the communication resource controller, a set of broadcast units of the plurality of broadcast units needed to transmit the at least one message to the multiple paging units;

d) storing identities of the set of broadcast units in either the communication resource controller or the operator station;

e) determining, by either the communication resource controller or the operator station, contending broadcast units and non-contending broadcast units of the set of broadcast units based on contention information and an order in which the identities of the set of broadcast units were stored;

f) storing, by either the communication resource controller or the operator station, identification of the contending broadcast units;

g) sending the at least one message to the non-contending broadcast units such that the non-contending broadcast units transmit the at least one message at a substantially identical time; and h) sending the at least one message to each of the contending broadcast units when contention for the contending broadcast unit has been alleviated.

* * * * *